United States Patent [19]

Morningstar

[11] 4,319,012

[45] Mar. 9, 1982

[54] SUSPENSION POLYMERIZATION PROCESS FOR MAKING VINYL RESINS FOR USE IN PLASTISOL

[75] Inventor: Marion G. Morningstar, Avon Lake, Ohio

[73] Assignee: The B. F. Goodrich Company, Akron, Ohio

[21] Appl. No.: 68,984

[22] Filed: Aug. 23, 1979

[51] Int. Cl.³ .............................................. C08F 2/20
[52] U.S. Cl. ..................................... 526/202; 525/56; 526/74; 526/344.2; 524/313; 524/306
[58] Field of Search ................................... 526/202, 74

[56] References Cited

U.S. PATENT DOCUMENTS

| | | | |
|---|---|---|---|
| 3,671,508 | 6/1972 | Koyanagi et al. | 526/344.2 |
| 3,825,509 | 7/1974 | Miller | 526/344.2 |
| 3,862,066 | 1/1975 | Reiter et al. | 526/202 |

Primary Examiner—Stanford M. Levin
Attorney, Agent, or Firm—Roy P. Wymbs

[57] ABSTRACT

This invention relates to making dense, spherical particles of vinyl plastisol resins by means of a suspension polymerization procedure. The dense, spherical particles or beads have a diameter of about 10 to about 100 microns and are made in an aqueous medium containing a free-radical yielding polymerization catalyst and in the presence of polyvinyl alcohol, as a suspending agent, and a surfactant having a hydrophile-lipophile balance (HLB) less than about 3.5. The suspension vinyl resins so produced are easily and uniformly mixed with a plasticizer to form low viscosity plastisols which are stable, containing particles of uniform and proper size and capable of producing films, and like products, of good clarity.

20 Claims, 2 Drawing Figures

Figure I. PVC made with HYDROXY-
PROPYL METHYL CELLULOSE
(1000X)
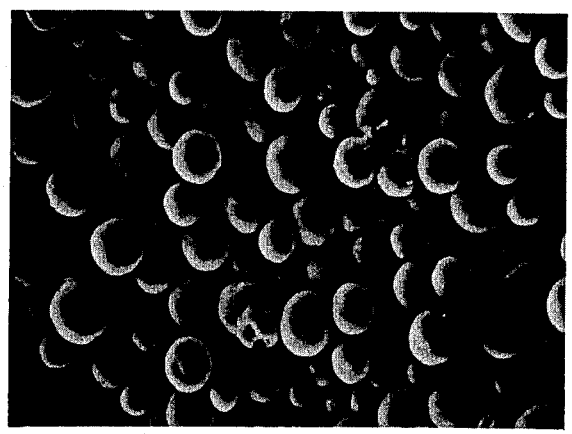
Figure 2. PVC made with 72.5% PVA
+ GLYCERYL TRIOLEATE (HLB=1.0)
(300X)

SUSPENSION POLYMERIZATION PROCESS FOR MAKING VINYL RESINS FOR USE IN PLASTISOL

BACKGROUND OF THE INVENTION

Vinyl resins, such as polyvinyl chloride (PVC) and certain copolymers of vinyl halides, represent a highly versatile class of synthetic resins which can be processed by various methods into a myriad of useful end products. In order to facilitate end-use processing, it is the usual practice in the art to design the vinyl resins for use in specific processing techniques. As a result, such designing necessarily requires adjusting the balance of the vinyl resin properties in order to enhance those which are desirable or necessary for the intended end use of the particular vinyl resin being made.

It is known that vinyl resins may be plasticized or changed from the hard, horny and stiff state to a soft, plastic workable condition by the addition thereto at elevated temperatures of certain plasticizers, such as dioctyl phthalate, for example. When the vinyl resin is so mixed or blended with a plasticizer, it is referred to as a "plastisol" and by virtue of the flowability thereof, it can be processed into various useful products, such as molded products, coatings, and the like. The vinyl resin must be capable of being mixed with a plasticizer easily and uniformly to form low viscosity plastisols which are stable, containing particles of uniform and proper size, and capable of producing films, and like products, of good clarity. It is often desirable to maximize the ability of the vinyl resins to absorb and/or to adsorb plasticizers in order to facilitate and increase their use in the manufacture of certain end products, such as, for example, flexible films and sheeting, and particularly for use in the flooring or floorcovering industry.

Various processes have heretofore been proposed and employed in order to attain vinyl plastisol resins with high plasticizer capacity and having increased flexibility, workability and distensibility. Chief among these processes has been the customary emulsion polymerization processes. However, suitable plastisol resins have been difficult to obtain via this route since the latices produced thereby contain polymer particles of varying size, the majority of which are either too fine or too large. The aqueous suspension polymerization technique has been employed in making vinyl plastisol resins or polymers but the same has resulted in the generation of very fine resin particles or "fines" which results in the inconvenient and detrimental creation of polymer dust. These fines hamper the pneumatic bulk handling of the vinyl resins and also create potential health hazards, that is, enough of the fines pass out in the plant effluent to put said plant out of compliance with the Environmental Protection Agency (EPA) requirements. More importantly, the use of many of the prior processes in making vinyl plastisol resins has resulted in drastic losses in the bulk density and heat stability of the resins, which in turn makes them unsuitable for many end uses and creates costly problems in handling and storage of such resins.

Accordingly, there is a need in the art for a process for producing vinyl plastisol resins which overcomes the aforementioned difficulties and is a convenient, inexpensive process which produces resins which retain the desirable properties ordinarily found in conventional or general purpose resins.

SUMMARY OF THE INVENTION

It has unexpectedly been found that when a proper combination of aqueous suspension polymerization conditions and polymerization ingredients are employed, vinyl plastisol resins having all the necessary and desirable properties can be produced. In the process of the present invention, the polymerization reaction of the vinyl monomer or monomers takes place in an aqueous medium using a free radical yielding polymerization catalyst or initiator, at a temperature in the range of about 35° C. to about 70° C., in the presence of a 72.5% hydrolyzed polyvinyl acetate (polyvinyl alcohol) as a suspending agent and a surfactant having a hydrophilelipophile balance, or HLB, less than about 3.5, and agitating the polymerization medium before and during polymerization thereof so as to produce polymer particles which are dense spherical glassy beads having an average diameter in the range of about 10 microns to about 100 microns. The suspension resins so produced are easily and uniformly mixed with a plasticizer to form low viscosity plastisols which are stable, containing particles of uniform and proper size, and capable of producing films, and like products, of good clarity. These properties are achieved in the vinyl plastisol resins without reduction in their other physical properties, such as their heat stability, bulk density and particle size distribution.

DETAILED DESCRIPTION

In the present invention "vinyl resin" or "vinyl plastisol resin" refers to polymers and copolymers of vinyl and vinylidene halides, such as vinyl chloride, vinylidene chloride, and the like. The vinyl halides and vinylidene halides may be copolymerized with each other or with one or more other vinylidene monomers having at least one terminal

grouping. As examples of such vinylidene monomers may be mentioned the α,β-olefinically unsaturated carboxylic acids, such as acrylic acid, methacrylic acid, ethacrylic acid, α-cyanoacrylic acid and the like; esters of acrylic acid, such as methyl acrylate, ethyl acrylate, butyl acrylate, octyl acrylate, cyanoethyl acrylate, and the like; esters of methacrylic acid, such as methyl methacrylate, butyl methacrylate, and the like; nitriles, such as acrylonitrile and methacrylonitrile; acrylamides, such as methyl acrylamide, N-methylol acrylamide, N-butoxy methacrylamide, and the like; vinyl ethers, such as ethyl vinyl ether, chloroethyl vinyl ether, and the like; the vinyl ketones, styrene and styrene derivatives including α-methyl styrene, vinyl toluene, chlorostyrene, and the like; vinyl naphthalene, allyl and vinyl chloroacetate, vinyl acetate, vinyl pyridine, methyl vinyl ketone, and othr vinylidene monomers of the types known to those skilled in the art. The present invention is particularly applicable to the manufacture of vinyl plastisol resins made by the suspension polymerization of vinyl chloride or vinylidene chloride alone or in admixture with one or more vinylidene monomers copolymerizable therewith in amounts as great as about 80% by weight, based on the weight of the monomer mixture. The most preferred vinyl plastisol resin is polyvinyl chloride (PVC) and the invention, for simplicity and convenience, will be described in connection therewith, it being understood that this is merely intended in an illustrative and not a limitative sense.

As pointed out hereinbefore, the present process for preparing vinyl plastisol resins is by means of the suspension polymerization technique in an aqueous medium. However, in the instant inventive process, it is necessary that certain specified materials be present in the polymerization medium and that certain conditions of polymerization be met in order to achieve the desired results.

As has been pointed out, it is the primary objective of this invention to produce dense, i.e., nonporous, spherical beads or particles of vinyl resins of the proper size which give the resins the proper bulk density and make them most desirable in making plastisols. Usefulness of a resin in plastisol applications is determined, to a large degree, by the physical structure of its component particles. The important parameters of such vinyl resins are mean particle size and size distribution, particle density as determined by porosity, particle shape, and degree of agglomeration. As will be seen from the description hereinafter, the present process produces vinyl plastisol resins which meet all these parameters, each of which is in the desired measurement range resulting in the production of end-products having superior properties.

The particle size distribution of the vinyl resins can be measured by Coulter-counter in water or by the Micromeretics sedigraph in a plasticizer. Either method gives the mean particle diameter as well as the distribution of the particle sizes. Most measurements employed herein, in connection with the specific examples, were made by Micromeretics and are reported as the mean diameter ($d_{50}$) in microns. In the present invention, the average particle size ranges from about 10 microns to about 100 microns, with a distribution of particle sizes in the range of about 1 micron to about 140 microns. The most useful range of average particle size is from about 15 microns to about 90 microns with a quite narrow particle size distribution. With respect to the procedures and equipment used above, the Coulter Counter is described in "Particle Size Measurement" by T. Allen in Chapter 13, 2nd Edition, published in 1975 by Chapman and Hall, London, and the Micromeretic Sedigraph is described in a paper by C. A. Daniels submitted and presented at the "ACS National Meeting" in Aneheim, Calif. in 1978.

The shape, that is, whether spherical or nonspherical, of the vinyl resin particles is determined from both light and SEM (Scanning Electron Micrograph) photomicrographs. The degree of distortion or cupping is readily seen, as well as any agglomeration of the particles. In the light microscope, wherein the resin particles are immersed in a plasticizer, such as dioctyl phthalate, porosity is easily seen as black particles or areas. It has been found that this data is in good qualitative agreement with porosimeter data. The term "cupping" used above relates to particles of suspension vinyl resins which, under the microscope, can be seen to be shaped like a cup. That is, the resin particles have one or more indentations on the surface which gives the appearance of a cup-shaped particle. This indentation on the surface results from a collapse during polymerization to accomodate the large density change in going from a monomer droplet to a solid resin particle. It is believed that this collapse results from the formation of an impermeable shell of polymer around each droplet of monomer(s) early in the polymerization and that as a higher degree of polymerization is attained, the polymer or resin particle must collapse to form "mono-cups" or "poly-cups". The disadvantage of these odd-shaped or cup-shaped particles is that they show very poor packing and will not produce a satisfactory pourable plastisol at the level of plasticizer normally employed in commercial operations. Reference should be had to FIG. 1 of the drawing which clearly shows the cup-shaped particles of PVC made using hydroxypropyl methyl cellulose as the suspending or dispersing agent. This Figure was made with the SEM at 1000 magnification.

The porosity of the vinyl resin particles is measured by mercury intrusion. While the microscope can provide visual qualitative data with respect to the porosity of resins, it cannot provide quantitative data. On the other hand, Mercury Intrusion porosimetry gives a quantitative value for porosity and this method was employed in testing the vinyl plastisol resins of the present invention. In this respect, reference is made to ASTM D 2873-70 which is a special adaptation of the Mercury Intrusion technique for the measurement of PVC pore volume. See also "Encyclopedia of PVC", published by Marcel Dekker, Inc. of New York, Vol. 1, pages 204–206. The porosity of the resins of the instant invention is usually in the range of about 0.01 cc/gm. to about 0.10 cc/gm., whereas the usual commercial vinyl resins, such as PVC, will have a porosity of 0.2 cc/gm. or higher. These figures show the dense particles that are obtained with the present invention and the same are shown in FIG. 2 of the drawing which was made with the SEM at 300 magnification.

Another important parameter in the usefulness of vinyl resins in plastisol applications is the bulk density of the resin. A very valuable test for characterizing the vinyl plastisol resins is the settled bulk density in water. From this test, one can calculate (1) the average particle density, which is another measure of porosity; (2) the packing fraction, which measures the geometry of packing, which in turn is a function of particle shape and size distribution; and (3) the settled bulk density. The settled bulk density is an accurate predictor of plastisol viscosity which is not surprising since it combines the elements of density and packing fraction in one parameter. The procedure employed for determining the settled bulk density of the vinyl resins was as follows: (1) weigh out 80 grams of dried resin into a 500 ml. beaker; (2) add 5 drops of 1% sodium lauryl sulfate to 400 ml. of distilled water; (3) add (2) to (1) slowly while stirring until the resin is wetted and pourable, using no more water than necessary to get a fluid suspension; (4) transfer the resin slurry to a weighed 250 ml. graduate; (5) add a few drops of an antifoaming agent and weigh graduate and slurry; (6) cover graduate and let it settle for 16-24 hours; and (7) measure volume of settled resin. The following calculations are then made:

$$\frac{\text{Resin Weight}}{\text{Settled Volume}} = \text{Settled Bulk Density (gm/cc.)} \quad \text{A.}$$

$$\frac{\text{Resin Weight}}{\text{Resin Volume}^{(1)}} = \text{Average Particle Density} \quad \text{B.}$$

[1]Resin Volume = Total Vol. − Vol. H$_2$O $$\frac{\text{Settled Bulk Density}}{\text{Average Particle Density}} = \text{Packing Fraction} \qquad C.$$

The settled bulk density, or bulk density, as referred to in the specific examples hereinafter, of the vinyl plastisol resins of the present invention will be in the range of about 0.6 gm/cc. to about 0.82 gm/cc. The most preferred resins will have a bulk density in the range of about 0.72 gm/cc, to about 0.82 gm/cc.

As pointed out above, certain specified materials must be present in the polymerization medium in order to obtain dense, spherical beads of polymer or copolymer having the desired particle size and distribution. The first important material is the use of polyvinyl alcohol consisting of 72.5% hydrolyzed polyvinyl acetate (PVA) as a suspending agent or dispersant. While the 72.5% PVA is most preferred, it is possible to use any PVA having a degree of hydrolysis in the range of about 65% to about 85%. Further, there can be used in the present invention mixtures of PVA's having different degrees of hydrolysis so long as the ratio of the different PVA's is such that the average degree of hydrolysis is in the range of about 65% and about 85%. For example, a mixture of 50% by weight of 72.5% PVA and 50% by weight polyvinyl alcohol consisting of 88% hydrolyzed polyvinyl acetate is satisfactory. The use of other suspending agents, such as hydroxypropyl methyl cellulose, will not produce the dense, spherical particles of polymer desired, as witness FIG. 1 of the drawing. It is to be understood that the above described suspending agents applies only to the present process where such suspending agents are employed in combination with certain nonionic surfactants, as described below.

The suspending agent or dispersant is employed in the polymerization mixture or medium in an amount in the range of about 0.5% to about 1.5% by weight, based on the weight of the monomer(s) being polymerized. Usually an amount in the range of about 0.75% to about 1.5% by weight is used to obtain the most satisfactory properties in the finished vinyl resins. The dispersant may be added to the reactor at any time prior to agitation to form the discrete droplets of monomer(s) to be polymerized and prior to the start of the reaction. Usually, however, the dispersant is added to the water in the reactor and agitated prior to the addition of the monomer(s).

One of the most important aspects of the instant invention is the use in the polymerization of the monomer(s) of a proper surfactant. The surfactant used, in conjunction with the herein described polyvinyl alcohol, is one which is nonionic and hydrophobic and has an HLB (hydrophile-lipophile balance) less than about 3.5. Preferably, the HLB of the surfactant should be less than about 2.5 In fact, the lower the HLB of the surfactant the better, that is, the more water-insoluble the surfactant is, the better are the desired properties in the finished vinyl resins and their use in making plastisols with superior properties.

The efficiency of nonionic surfactants or surface active agents is related to the polarity of the molecule, that is, the relation between the contribution of the polar hydrophilic head and the non-polar lipophilic tail. This polarity for nonionic surfactants is defined in terms of an empirical quantity which is called the hydrophile-lipophile balance or HLB, as referred to above. The HLB is explained and the method of determining the same is set out in "Nonionic Surfactants" edited by Martin J. Shick at pages 604-612, published in 1967 by Marcel Dekker, Inc., New York. The amount of surfactant used in the present process is in the range of about 0.1% to about 1.5% by weight, based on the weight of the monomer(s) to be polymerized. More than one surfactant may be employed in the polymerization mixture so long as the combined HLB of the surfactants does not exceed 3.5. For example, two surfactants, each of which has an HLB of 1.0, can be used satisfactorily. The most beneficial results are obtained when the surfactant(s) is employed in the range of about 0.25% to about 1.0% by weight. It should be pointed out that the surfactants used herein have a synergistic effect with the 72.5% PVA dispersant which results in more spherical, better formed particles of resin which are smaller with a narrowed particle size distribution. In other words, the combination of dispersant and surfactant described herein is most important in achieving the desired results of the invention.

The nonionic surfactants having the proper HLB as described above, are those falling within the classes of polyoxyethylene esters of fatty acids, fatty esters and ethoxylated fatty esters of polyols, aromatic and aliphatic esters of long chain alcohols containing more than 7 carbon atoms, epoxidized triglycerides, block copolymers of polyoxyethylene and polyoxypropylene, polyoxyethylene ethers, ethoxylated alkyl phenols, ethoxylated amines, and the like. As examples of suitable surfactants there may be named glycerol trioleate, ethylene glycol distearate, sorbitan trioleate, epoxidized soy bean oil, dioctyl phthalate, sorbitan tristearate, ethylene glycol trioleate, sorbitan trioleate, diethylene glycol monolaurate, acetylated sucrose fatty ester, n-hexadecane, lauryl-stearyl alcohol, liquid vegetable and animal fats and oils, and the like. There also may be named liquid aliphatic hydrocarbons with low water-solubility, for example, $C_{12}$ to $C_{30}$ compounds either pure or mixed, liquid esters with high enough molecular weight to have low water solubility, high molecular weight chlorinated hydrocarbons, high molecular weight alcohols, such as those of 8 carbon atoms or more, and the like. Numerous other nonionic surfactants having the proper HLB factor will be apparent to those skilled in the art.

The surfactant can be added to the reactor at any time prior to polymerization. However, it is usually added to the water along with the dispersant and prior to addition of the monomer(s).

Also necessary in the polymerization medium is a proper catalyst or initiator which affects or determines the temperature and time of reaction. Also the selection of the initiator will be dependent upon the molecular weight desired in the finished polymer or resin. Further, the temperature of the reaction largely determines the molecular weight. The catalyst or initiator employed in the present invention is a monomer-soluble, that is, an oil-soluble, catalyst or free radical initiator having low water-solubility, which may be an azo or peroxy compound such as, for example, azo-bis-isobutyronitrile, 2,2'-azo-bis(2,4-dimethylvaleronitrile), tert-butyl peroxypivolate, lauroyl peroxide, caproyl peroxide, benzoyl peroxide, diisononoyl peroxide, bis(2,4-dichlorobenzoyl) peroxide, bis(orthomethyl benzoyl) peroxide, dicetyl peroxydicarbonate, isopropylperoxy dicarbonate, di-secondary butyl peroxydicarbonate, di-normal propyl peroxydicarbonate, bis(4-tert-butyl cyclohexyl) peroxydicarbonate, di(2-ethyl hexyl) peroxydicarbonate, and the like. In the present process the selected catalyst or initiator should be present in the polymerization medium in an amount in the range of about 0.01% to about 0.5% by weight, based on the weight of monomer(s) being polymerized. It has been found, after repeated experimentation, that an amount of catalyst in the range of 0.04% to 0.2% by weight gives extremely satisfactory results, not only in the polymerization reaction, but also in the finished product, or vinyl resin produced.

Normally, in the suspension polymerization of a vinyl monomer or monomers, the catalyst or initiator can be added to the polymerization medium at any time, provided that the temperature is kept below the temperature of reactivity of the particular catalyst during addition in order that the reaction is not started prematurely. In the present invention, however, the catalyst or initiator is added as the last ingredient to the reaction mixture just prior to raising the temperature of the reaction medium to the temperature at which polymerization is to take place. This addition is after the medium to be polymerized has been adequately agitated in order to disperse the monomer(s) in proper droplet size to be polymerized to give the desired particle size vinyl resin. After the catalyst addition, the temperature of the polymerization mixture is raised to that at which the reaction is to take place.

Molecular weight of the vinyl resin is important since it controls the strength of the fused particle, that is, after the resin has been formed into a shaped article from the plastisol. Molecular weight is measured by inherent viscosity (I.V.) and one of the factors which determines molecular weight of the vinyl resin or polymer is the temperature at which the polymerization of the monomer(s) takes place. The temperature of the reaction in the present process will normally be in the range of about 30° C. to about 70° C. Satisfactory results are obtained when the temperature of reaction is in the range of about 45° C. to about 60° C. The time of the reaction will usually be from about 6 hours to about 12 hours with agitation of the reaction medium being employed throughout the entire time of reaction. The agitation is usually constant but may be varied, if desired, during the reaction cycle. In general, for solid applications of the vinyl resins herein produced, an I.V. of about 1.0 is considered adequate. For foam applications, an I.V. of about 0.95 is ideal. The vinyl resins produced in accordance with the present invention will have an I.V. in the range of about 0.80 to about 1.20. It is interesting to note the relationship of the temperature of the polymerization reaction and the I.V. of the vinyl resin produced. For example, in polymerizing vinyl chloride to make PVC by the process of the present invention, when the temperature of reaction was at 60° C. a PVC having an I.V. of about 0.85 was produced. When the temperature of reaction was at 54° C. a PVC having an I.V. of about 0.95 to 1.0 was produced.

One of the most important aspects of the instant invention is the agitation that is required or necessary, both before the polymerization reaction and during the reaction. Generally, a premix is formed containing the recipe ingredients and the same is thoroughly mixed with sufficient shear action to disperse the monomer(s) in the reaction medium in the form of tiny droplets. The droplets should be of such size that when transformed into polymer particles the same will be of the desired size, that is, within the particle size range given above. The monomer(s) droplet size should be within the range of about 1.2 to about 165 microns in diameter to achieve the desired results, and preferably within the range of 6 to 118 microns.

In addition to having the proper agitation, or shear, prior to the start of polymerization, it is most important to maintain proper and sufficient agitation throughout the entire polymerization reaction in order to produce dense, spherical particles of vinyl resins having the proper size. Various means can be employed to get and maintain the proper agitation and shearing action. The reaction vessel or polymerizer is made of stainless steel or glass lined fitted with a heating and cooling jacket and having a rotatable shaft mounted centrally thereof. On said shaft are mounted one or more three-pronged agitator blades, the prongs of which are preferably curved and pitched, that is, are contoured. Of course, blades with more or less than three prongs may be used. Further, baffles are mounted internally of the reaction vessel, which gives an up and down, or pumping, action to the reaction medium in addition to the circular motion thereof. One or more baffles are employed mounted on the inner wall of the reactor or adjacent thereto.

The following is exemplary of the type agitator blades useful in the practice of the present invention. In a three liter stainless steel vessel, with a heating and cooling jacket and a central rotatable shaft, there were mounted two baffles and three types of agitator blades on the shaft, each in pairs. Polymerizations were run with each pair of blades. Dimensions of the blades and results were as follows:

TABLE I

| Blade | Diameter | Width | Pitch | Shear Action | Pumping Action |
|---|---|---|---|---|---|
| A | 74 mm. | 12 mm. | 22° | Highest | Medium |
| B | 66 mm. | 12 mm. | 25° | Lowest | Highest |
| C | 74 mm. | 9 mm. | 15° | Medium | Lowest |

As the reactor capacity is enlarged, adjustment in the diameter, width and pitch of the blades must be made in order to achieve the desired agitation. This adjustment can readily be made without difficulty. The agitation will also be influenced by the monomer(s) being polymerized and the temperature of the reaction.

There is no question that the hydrophobic surfactant produces vinyl resin particles that are more spherical in shape and have less porosity for a given particle size. It is felt that the hydrophilic and hydrophobic surfactants act independently of each other because of the extreme difference in their solubilities. The hydrophilic surfactant, along with the agitation, determines the monomer(s) droplet size, and subsequently, the vinyl resin particle size, and also serves to protect the monomer-polymer particle from collision induced fusion which substantially eliminates the formation of polymer agglomerates.

It is further felt that since the hydrophobic surfactant is so insoluble in water it does not accumulate at the monomer-water interface but rather remains completely soluble in the monomer. When tiny resin or polymer particles begin to form in the monomer(s) droplet, the normal tendency is for them to migrate to the water-monomer interface where they grow together to form a shell of polymer or vinyl resin. If the shell is impervious as polymerization proceeds, the spherical droplet collapses to accommodate volume shrinkage, producing highly distorted resin particles, such as the cupped particles shown in FIG. 1 of the drawing. If the shell is permeable, or porous, water can intrude resulting in porous but spherical particles. The hydrophobic surfactant goes to the monomer-polymer interface where it serves to disperse the polymer sub-particles and prevents their agglomerating at the water interface. By keeping the sub particles in suspension through the agitation the monomer-polymer droplet can shrink uniformly and continuously to form a non-porous, spherical resin particle, such as shown in FIG. 2 of the drawing.

As has been pointed out herein, the resins or polymers of the present invention are suspension vinyl plastisol resins since they are designed primarily for use in plastisols. Plastisols are made with the instant suspension resins by uniformly blending or intimately mixing, by conventional means, with 100 parts by weight of the suspension resin, from about 30 to about 100 parts by weight of one or more plasticizers. The useful plasticizers may be described as the alkyl or alkoxy alkyl esters of dicarboxylic acids or the esters of a polyhydric alcohol and a monobasic acid. As examples of such materials there may be named dibutyl phthalate, dioctyl phthalate, diallyl phthalate, dibutyl sebacate, dinonyl phthalate, di(2-ethyl hexyl) phthalate, di(2-ethyl hexyl) adipate, dilauryl phthalate, dimethyl tetrachlorophthalate, butyl phthalyl butyl glycollate, glyceryl stearate, and the like. Other plasticizers, known to those skilled in the art, may likewise be employed. The preferred plasticizers are the liquid diesters of aliphatic alcohols having from 4 to 20 carbon atoms and dibasic carboxylic acids having from 6 to 14 carbon atoms.

While the vinyl resins of the present invention are used alone in making plastisols, there are many applications of the finished plastisols where it is desirable to blend another resin with the vinyl resin produced herein in order to obtain certain desirable properties in articles made therefrom. The properties referred to are such things as tensile strength, gloss, and the like. It has been found that excellent results are obtained when employing vinyl resin blends containing from about 10 parts to about 95 parts by weight of the vinyl resin of the present invention and from about 5 parts to about 90 parts by weight of a regular resin, such as PVC, having a particle size in the range of about 0.3 to about 5.0 microns in diameter. The regular resin used for such blending purposes will not necessarily be in the form of dense, spherical particles, as is the case with the vinyl resin produced in accordance with the instant invention. Preferred resin blends are those containing from 40 parts to 90 parts by weight of the vinyl resin produced herein and from 10 parts to 60 parts by weight of a regular resin. While it is not necessary, usually the regular resin will be a dispersion resin made from one or more vinyl and vinylidene halides using the emulsion polymerization process.

The plastisols made from the suspension vinyl resins of the present invention should have the desired yield and preferably, with little or no dilantency. Yield is simply defined as resistance to flow and is normally determined numerically through viscosity measurements employing well known standard techniques. Normally such values are arrived at by calculation from viscosity measurements using a Brookfield Model RVF Viscometer according to ASTM method D1824-61T. Yield is determined from viscosity measurements of the plastisols at varying r.p.m.'s (revolutions per minute) after initial preparation and at intervals of aging. The viscosity is measured in centipoises (cps.) at a temperature of 23° C. In the specific examples, that follow hereinafter, and in the data set out in connection therewith, viscosity measurements were made at 2 rpm and 20 rpm and are expressed as $V_2$ and $V_{20}$ respectively.

Another important feature of the suspension process of the instant invention is that the internal surfaces of the polymerization reactor are quite clean. That is to say that little or no polymer buildup occurs thereon during the course of the polymerization reaction, as is the case when making regular vinyl resin by the suspension technique. The dense particles do not agglomerate, as a rule. What buildup that might occur, using the present process, is not of the difficult-to-remove hard crusty type and can readily be removed by rinsing or hosing down with water and without opening the reactor when appropriate spray nozzles are installed in the reactor. However, if need be, even this small amount of buildup can be controlled by various known methods, such as by applying an appropriate coating to the reactor surfaces, or by keeping the walls of the reactor cool during the polymerization reaction, and the like. Operating with a clean reactor, as in the present invention without the aid of assistants in this regard, is a distinct advantage in view of recently promulgated Governmental regulations with respect to the emission to the atmosphere of detrimental chemical materials.

To further illustrate the present invention, the following specific examples are given, it being understood that this is merely intended in an illustrative and not a limitative sense. In the examples, all parts and percents are by weight unless otherwise indicated.

EXAMPLE I

In this Example, dense, spherical polyvinyl chloride (PVC) was produced in a 3 liter reactor using the following recipe:

| | |
|---|---|
| Vinyl chloride | 100 parts |
| Water (demineralized) | 150 |
| 72.5% PVA(4.97% in H$_2$O) | 1.0 |
| Sorbitan trioleate(HLB 1.8) | 0.5 |
| Lauroyl peroxide (7 gms. in toluene) | 0.15 |

First, the water was added to the reactor and then the 72.5% PVA and sorbitan trioleate and then agitated for one minute. The agitation used was the A Blade, as defined above, with 2 blades mounted on the agitator shaft. The blades were agitated at 900 rpm. Then the vinyl chloride was charged to the reactor and the mixture, or polymerization medium, was agitated at 900 rpm. at room temperature for 15 minutes. After that the catalyst (lauroyl peroxide) was injected into the reaction medium and the temperature raised to 60° C. The agitation was continued throughout the reaction until a pressure drop in the reactor 3.5 Kg/cm$^2$ occurred. The reaction was then stopped and the polymer slurry was removed from the reactor, washed and dried, in the usual manner. The recovered vinyl resin or polymer was then tested and the following results were obtained:

| Resin Properties | |
|---|---|
| d$_{50}$ (Avg. particle size) | 25μ |
| Porosity (cc/gm.) | 0.017 |
| Bulk Density (gm./cc) | 0.80 |

-continued

| Resin Properties | |
|---|---|
| I.V. (Inherent viscosity) | 0.85 |

In order to determine RVF viscosity, and other properties, a plastisol was made with the PVC of this example and a regular PVC blended therewith, as indicated in the following recipe:

| | |
|---|---|
| PVC (Ex.I.) | 90 parts |
| Regular PVC | 10 |
| Dioctyl phthalate | 57 |
| Epoxidized soybean oil | 3 |
| Ba—Zn Phosphite stabilizer | 2 |

The analytical data with respect to the plastisol was as follows:

| | |
|---|---|
| North Fineness | 2 |
| Brookfield Viscosity | |
| Initial $V_2$ | 3300 cps. |
| $V_{20}$ | 3500 cps. |
| 1 Day $V_2$ | 4000 cps. |
| $V_{20}$ | 3050 cps. |
| Severs Efflux | 125 |

The above data shows the desired low Brookfield viscosity with essentially zero viscosity aging as well as the very low high-shear viscosity (Severs Efflux) which is desirable and superior to resins produced heretofore.

EXAMPLE II

In this Example, a series of runs were made using the recipe and procedure of Example I, with the exception that various surfactants were employed. Also, lauroyl peroxide was used as catalyst in Runs 1–13 and di(2-ethyl hexyl) peroxydicarbonate was used as catalyst in Runs 14–17. In addition, the number of baffles and temperature of the reaction was varied, as indicated in the table of results that follows. Further, the type blades were changed and, in some instances, the rpm of said blades was varied. In said table the first figure under "Blend" denotes the parts of vinyl resin from this Example II and the second figure denotes the parts of regular PVC blended therewith. The remainder of the plastisol recipe of Example I was used. The results are recorded in the following Table No. II.

TABLE II

| Run No. | Surfactant | HLB | Blade | RPM | $Rx^1$ (Hrs.) | $APS^2$ $d_{50}$ | $Poros^3$ cc/gm | Bulk Density gm/cc | Blend | $North^4$ Fineness | $V_{20}$ 1 Day | $Severs^5$ Efflux |
|---|---|---|---|---|---|---|---|---|---|---|---|---|
| 1 BAFFLE - 60° C. REACTION ||||||||||||||
| 1. | Glycerol Trioleate | 1.0 | B | 1000 | 10.5 | 43 | 0.015 | 0.76 | 70/30 | 1 | 3000 | 114 |
| 2. | Ethylene Glycol Distearate | 1.5 | B | 1000 | 9.6 | 43 | 0.013 | 0.77 | 70/30 | 0.5 | 2400 | 174 |
| 3. | Lauryl-Stearyl Alcohol | — | A | 1000 | 6.8 | 32 | 0.05 | 0.72 | 70/30 | 0 | 2100 | 128 |
| 4. | Epoxidized Soy Bean Oil | 1.0 | B | 1000 | 10.3 | 33 | 0.05 | 0.67 | 70/30 | 1 | 3800 | 90 |
| 5. | Epoxidized Soy Bean Oil | 1.0 | A | 1000 | 10.0 | 27 | 0.039 | 0.73 | 70/30 | 1 | 2675 | 145 |
| 2 BAFFLES - 60° C. REACTION ||||||||||||||
| 6. | Glycerol Trioleate | 1.0 | A | 1000 | 11.5 | 24 | 0.015 | 0.80 | 90/10 | 1 | 6200 | 89 |
| 7. | Sorbitan Tristearate | 2.1 | B | 1000 | 10.1 | 29 | 0.014 | 0.68 | 80/20 | 0.5 | 9400 | 67 |
| 8. | Glycerol Trioleate | 1.0 | B | 1000 | 11.3 | 36 | 0.031 | 0.75 | 90/10 | 2.5 | 4300 | 98 |
| 9. | Lauryl-Stearyl Alcohol | — | A | 1000 | 12.4 | 24 | 0.094 | 0.66 | 70/30 | 2.5 | 5700 | 63 |
| 10. | Lauryl-Stearyl Alcohol | — | A | 1000 | 10.7 | 24 | 0.107 | 0.66 | 70/30 | 3.5 | 6200 | 51 |
| 11. | Dioctyl Phthalate | — | C | 1000 | 9.8 | 33 | 0.046 | 0.68 | 70/30 | 4 | 3500 | 109 |
| 12. | Sorbitan Trioleate | 1.8 | A | 1100 | 20+ | 14 | 0.141 | 0.60 | 70/30 | 0 | 7800 | 44 |
| 13. | Epoxidized Soy Bean Oil | 1.0 | A | 900 | 13.8 | 27 | 0.05 | 0.67 | 70/30 | 2.5 | 4200 | 101 |
| 2 BAFFLES - 54° C. REACTION ||||||||||||||
| 14. | Glycerol Trioleate | 1.0 | A | 1000 | 6.5 | 78 | 0.018 | 0.79 | 90/10 | 0 | 2800 | 212 |
| 15. | Glycerol Trioleate | 1.0 | A | 1100 | 6.7 | 55 | 0.024 | 0.81 | 90/10 | 0 | 2500 | 178 |
| 16. | Sorbitan Trioleate | 1.8 | A | 1100 | 15.2 | 37 | 0.188 | 0.63 | 70/30 | 0 | 9200 | 42 |
| 17. | Glycerol Trioleate | 1.0 | C | 1200 | 8.3 | 53 | 0.008 | 0.78 | 90/10 | 0 | 2450 | 197 |

[1] Reaction Time
[2] Average Particle Size
[3] Porosity
[4] Measure of largest particles
[5] High shear viscosity - ASTM

EXAMPLE III

In this Example, dense, spherical PVC particles were produced in a 3 liter reactor using the following recipe:

| | |
|---|---|
| Vinyl Chloride | 100 parts |
| Water (demineralized) | 150 |
| 72.5% PVA (4.67% in H$_2$0) | 1.0 |
| Sorbitan trioleate (HLB 1.8) | 0.5 |
| Dicetyl peroxydicarbonate | 0.2 |

First, the water was added to the reactor and then the 72.5% PVA and sorbitan trioleate and the mixture agitated for one minute. Then the vinyl chloride was charged to the reactor and then the catalyst (dicetyl peroxydicarbonate) was injected into the reaction medium. The reaction medium was then agitated at 1000 rpm. at room temperature for 15 minutes. The temperature of the reaction mixture was then raised to 50° C. and the agitation was continued throughout the reaction until a pressure drop in the reactor of 3.5 Kg/cm$^2$ occurred. The reaction was then stopped and the polymer slurry was removed from the reactor, stripped and dried in the usual manner. The reaction time was 7.7 hours and the inner surfaces of the reactor were virtually clear of polymer buildup. The recovered polymer or PVC was then tested with the following results:

| Resin Properties | |
|---|---|
| $d_{50}$(Avg. particle size) | 29μ |
| Porosity (cc./gm.) | 0.015 |
| Bulk density (gm./cc.) | 0.84 |

In order to determine RVF viscosity, and other properties, plastisols were made with the PVC of this Example alone and blended with a regular PVC having an average particle size of one micron. The plastisol recipes and the analytical data with respect thereto are set forth in the following table:

TABLE III

| | 1. | 2. | 3. |
|---|---|---|---|
| PVC (EX. III) | 100 parts | 90 parts | 70 parts |
| PVC (one micron) | | 10 | 30 |
| Dioctyl phthalate | 57 | 57 | 57 |
| Epoxidized soy bean oil | 3 | 3 | 3 |
| Ba—Zn phosphite stabilizer | 2 | 2 | 2 |
| Brookfield Viscosity | | | |
| Initial V$_2$ | 17,500 cps. | 2,200 cps. | 1,200 cps. |
| V$_{20}$ | 16,000 | 2,000 | 1,300 |
| 1-Day V$_2$ | 15,000 | 2,500 | 1,500 |
| V$_{20}$ | 12,250 | 2,250 | 1,400 |
| 7-Days V$_2$ | 17,500 | 2,500 | 2,000 |
| V$_{20}$ | 11,500 | 2,400 | 1,650 |
| North Fineness | 1 | 2 | 2 |
| Severs Efflux | 95.8 | 165 | 196 |

Again, as in the previous examples the data shows the low viscosity as well as the low Severs Efflux which is desirable and superior to well known resins produced heretofore.

It can readily be seen from the above results that the dense, spherical particles of vinyl resins of the present invention are superior to conventional vinyl resins produced heretofore. For example, the Severs or high shear viscosity of vinyl resins normally used in plastisols is about 11 to 12 whereas the above Severs are much higher which is most desirable. Further, the Brookfield Viscosity (V$_{20}$) is much lower than that of present day plastisols which results in superior properties in finished articles made therefrom.

The present invention presents many advantages over the prior art, other than those already referred to herein. For example, plastisol vinyl resins are normally made using the emulsion polymerization procedures resulting in what is referred to as dispersion resins. The advantage of the suspension polymerization process, such as used herein, lies both in the relative simplicity of the process and in the fact that the vinyl resin can be dewatered by a low energy filtration process rather than by high energy spray drying, such as employed in the emulsion polymerization process. Under present day circumstances, relative to energy conservation, this becomes extremely important. Another important advantage of the vinyl plastisol resins produced herein is that they do not agglomerate and exhibit essentially no viscosity aging. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

I claim:

1. A suspension polymerization process for producing polymers of vinyl and vinylidene halides and copolymers thereof with each other or either with one or more vinylidene monomers having at least one terminal

grouping consisting of, forming a monomer premix containing the monomer or monomers to be polymerized, the aqueous reaction medium, from about 0.5% to about 1.5% by weight, based on the weight of the monomer(s), of a polyvinyl alcohol suspending agent which is hydrolyzed polyvinyl acetate having a degree of hydrolysis in the range of about 65% to about 85%, and from about 0.1% to about 1.5% by weight, based on the weight of the monomer(s) of a nonionic surfactant having a Hydrophile-Lipophile Balance of less than about 3.5, agitating said premix to form suspended droplets of monomer(s) in the premix, adding from about 0.01% to about 0.5% by weight, based on the weight of the monomer(s), of an oil-soluble free-radical yielding polymerization catalyst to said agitated premix, polymerizing said premix with continued agitation at a temperature in the range of about 30° C. to about 70° C. to form an aqueous slurry of dense, spherical and glassy polymer particles having a diameter in the range of about 10 to about 100 microns, and thereafter recovering said particles from said slurry, and wherein polymer buildup during the polymerization process is substantially reduced.

2. A process as defined in claim 1 wherein the monomer in the premix is vinyl chloride.

3. A process as defined in claim 2 wherein the catalyst is lauroyl peroxide.

4. A process as defined in claim 2 wherein the catalyst is di(2-ethyl hexyl) peroxydicarbonate.

5. A process as defined in claim 1 wherein the polyvinyl alcohol is 72.5% hydrolyzed polyvinyl acetate.

6. A process as defined in claim 1 wherein the nonionic surfactant is glycerol trioleate.

7. A process as defined in claim 1 wherein the nonionic surfactant is ethylene glycol distearate.

8. A process as defined in claim 1 wherein the nonionic surfactant is epoxidized soy bean oil.

9. A process as defined in claim 1 wherein the nonionic surfactant is sorbitan tristearate.

10. A process as defined in claim 1 wherein the nonionic surfactant is sorbitan trioleate.

11. A process as defined in claim 6 wherein the monomer in the premix is vinyl chloride.

12. A process as defined in claim 7 wherein the monomer in the premix is vinyl chloride.

13. A process as defined in claim 8 wherein the monomer in the premix is vinyl chloride.

14. A process as defined in claim 9 wherein the monomer in the premix is vinyl chloride.

15. A process as defined in claim 10 wherein the monomer in the premix is vinyl chloride.

16. A process as defined in claim 11 wherein the polyvinyl alcohol is 72.5% hydrolyzed polyvinyl acetate.

17. A process as defined in claim 12 wherein the polyvinyl alcohol is 72.5% hydrolyzed polyvinyl acetate.

18. A process as defined in claim 13 wherein the polyvinyl alcohol is 72.5% hydrolyzed polyvinyl acetate.

19. A process as defined in claim 14 wherein the polyvinyl alcohol is 72.5% hydrolyzed polyvinyl acetate.

20. A process as defined in claim 15 wherein the polyvinyl alcohol is 72.5% hydrolyzed polyvinyl acetate.

* * * * *